US009550465B1

(12) United States Patent
EL-Jawahri et al.

(10) Patent No.: US 9,550,465 B1
(45) Date of Patent: Jan. 24, 2017

(54) AIRBAG FOR OBLIQUE VEHICLE IMPACTS

(71) Applicant: Ford Global Technologies, LLC, Dearborn, MI (US)

(72) Inventors: Raed Essa EL-Jawahri, Northville, MI (US); Jamel E. Belwafa, Ann Arbor, MI (US); James Chih Cheng, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/000,320

(22) Filed: Jan. 19, 2016

Related U.S. Application Data

(60) Provisional application No. 62/192,245, filed on Jul. 14, 2015.

(51) Int. Cl.
| | | |
|---|---|---|
| *B60R 21/203* | (2006.01) | |
| *B60R 21/2338* | (2011.01) | |
| *B60R 21/015* | (2006.01) | |
| *B60R 21/0134* | (2006.01) | |
| *B60R 21/233* | (2006.01) | |
| *B60R 21/00* | (2006.01) | |
| *B60R 21/16* | (2006.01) | |

(52) U.S. Cl.
CPC ..... *B60R 21/01512* (2014.10); *B60R 21/0134* (2013.01); *B60R 21/203* (2013.01); *B60R 21/233* (2013.01); *B60R 21/2338* (2013.01); *B60R 2021/0032* (2013.01); *B60R 2021/161* (2013.01); *B60R 2021/23382* (2013.01)

(58) Field of Classification Search
CPC ............... B60R 21/0136; B60R 21/203; B60R 21/2338; B60R 21/2035; B60R 21/2032; B60R 21/2037; B60R 21/2334; B60R 2021/161; B60R 2021/23384; B60R 2021/23382
See application file for complete search history.

(56) References Cited

U.S. PATENT DOCUMENTS

| | | | | |
|---|---|---|---|---|
| 5,358,273 | A * | 10/1994 | Onishi | B60R 21/233 280/729 |
| 5,984,355 | A * | 11/1999 | Meidanis | B62D 1/197 280/777 |
| 6,254,121 | B1 | 7/2001 | Fowler et al. | |
| 6,254,130 | B1 * | 7/2001 | Jayaraman | B60R 21/233 280/731 |

(Continued)

FOREIGN PATENT DOCUMENTS

| | | |
|---|---|---|
| DE | 2004011369 B4 | 1/2010 |
| EP | 1183170 B1 | 3/2003 |

(Continued)

*Primary Examiner* — Barry Gooden, Jr.
(74) *Attorney, Agent, or Firm* — Frank MacKenzie; Bejin Bieneman PLC

(57) ABSTRACT

An airbag system includes an inflator and an airbag in communication with the inflator. The airbag system includes a tether actuator and tethers extending from the tether actuator to the airbag. A controller is programmed to receive signals from an impact sensing system and a steering wheel angle sensor. The controller is programmed to instruct the tether actuator to release at least one of the tethers based at least on the signals from the steering wheel angle sensor and the impact sensing system.

6 Claims, 6 Drawing Sheets

(56) References Cited

U.S. PATENT DOCUMENTS

| | | | | |
|---|---|---|---|---|
| 6,315,323 | B1* | 11/2001 | Pack, Jr. | B60R 21/233 |
| | | | | 280/735 |
| 6,616,184 | B2* | 9/2003 | Fischer | B60R 21/205 |
| | | | | 280/735 |
| 6,962,363 | B2 | 11/2005 | Wang et al. | |
| 8,157,291 | B2* | 4/2012 | Mayer | B60R 21/0134 |
| | | | | 280/735 |
| 9,333,940 | B2* | 5/2016 | Hicken | B60R 21/33 |
| 9,393,925 | B2* | 7/2016 | Miron | B60R 21/2338 |
| 2004/0119271 | A1* | 6/2004 | Webber | B60R 21/217 |
| | | | | 280/731 |
| 2005/0212276 | A1* | 9/2005 | Yamada | B60R 21/2338 |
| | | | | 280/743.2 |

FOREIGN PATENT DOCUMENTS

| | | |
|---|---|---|
| JP | 2010241241 A | 10/2010 |
| KR | 20130083264 A | 7/2013 |

\* cited by examiner

AIRBAG FOR OBLIQUE VEHICLE IMPACTS

CROSS-REFERENCE TO RELATED MATTER

This application claims the benefit of United States provisional patent application entitled "AIRBAG FOR OBLIQUE VEHICLE IMPACTS filed Jul. 14, 2015 and assigned Ser. No. 62/192,245, which is incorporated by reference herein.

BACKGROUND

Vehicles may include a variety of airbags deployable during vehicle impacts to absorb energy from occupants of the vehicles during the impact. The airbag may be a component of an airbag assembly including a base supporting the airbag, and an inflation device in communication with the airbag for inflating the airbag from an uninflated position to an inflated position. The airbag assemblies may be supported on a steering wheel of the vehicle, an instrument panel of the vehicle, a headliner of the vehicle, etc.

The vehicle may include an impact sensing system in communication with the airbag assembly for sensing a vehicle impact and instructing the inflation device to inflate the airbag when a vehicle impact is sensed. The impact sensing system may sense the direction of the impact and may selectively inflate, or not inflate, certain airbags of the vehicle when an impact is sensed based on the type and magnitude of impact that is sensed, e.g., based on direction, magnitude, etc.

Vehicles are subject to a variety of impact tests. These impact tests may include those standardized by the National Highway Traffic and Safety Agency (NHTSA). These impact tests may include, for example, oblique impact tests. One such test is the small overlap rigid barrier (SORB) test in which the vehicle is impacted in the front left corner of the vehicle at an oblique angle with a rigid barrier. In this test, the test dummy in the driver seat is urged forwardly and toward the driver side door of the vehicle. Another type of impact test is the angular impact test, in which the test dummy in the driver seat is urged in a cross-vehicle direction toward the driver side door of the vehicle.

DETAILED DESCRIPTION

Figure 4:
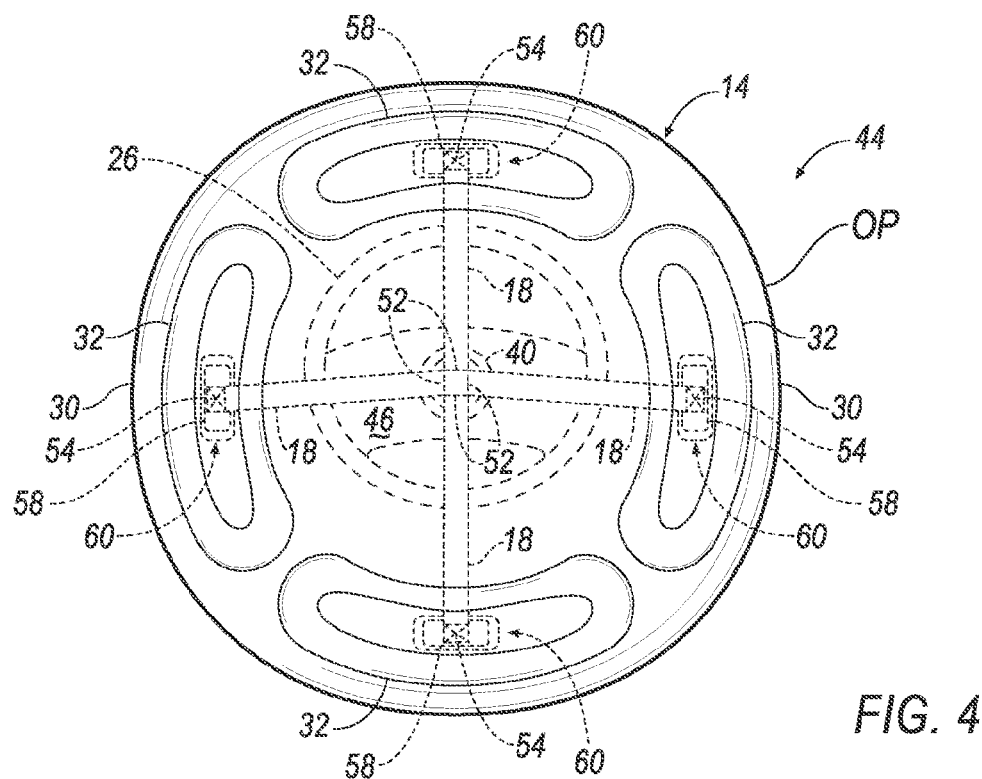
FIG. 4 is a front view of the airbag assembly supported by the steering wheel in the inflated position with each of the extensions in an undeployed position.
Figure 5:
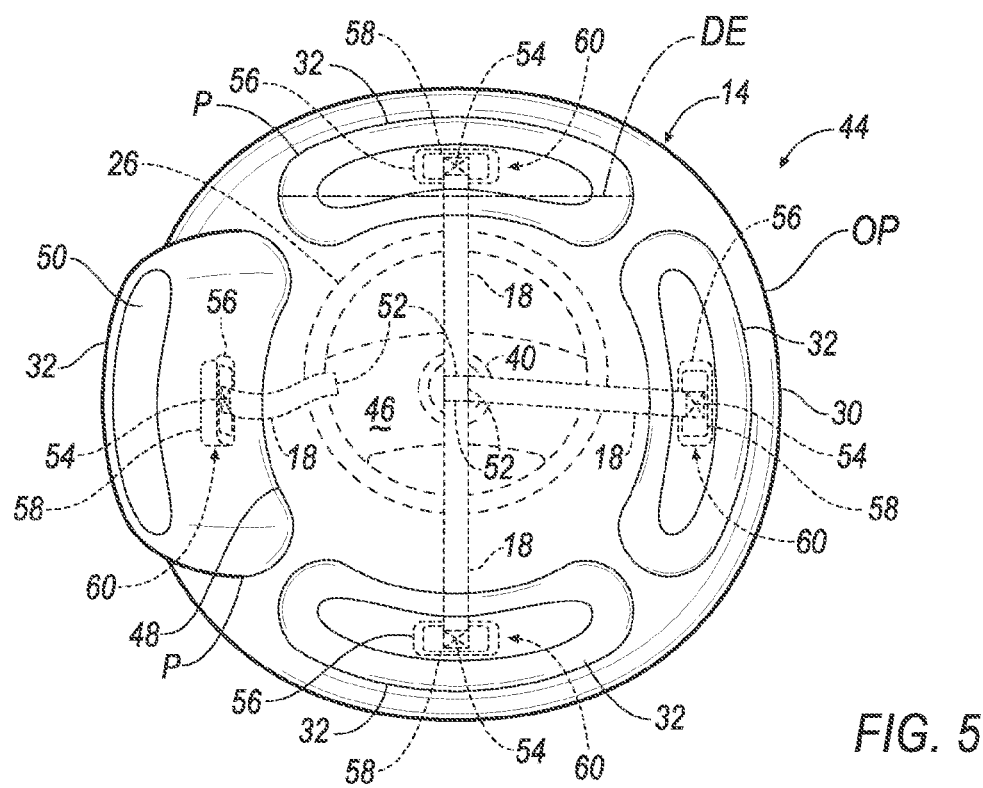
FIG. 5 is a perspective view of the airbag assembly supported by the steering wheel with the airbag in the inflated position and on of the extensions in the deployed position.
Figure 9:
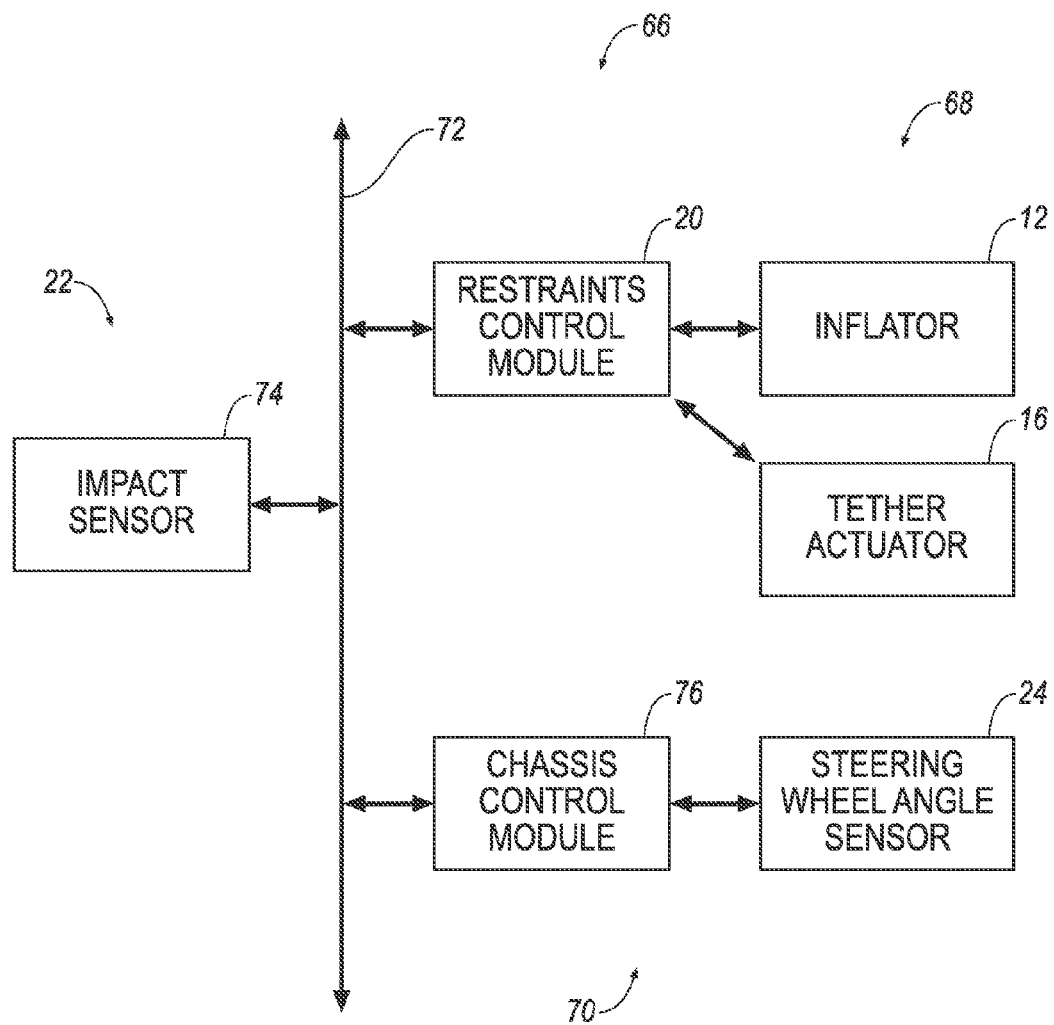
FIG. 9 is a schematic of a control system of the vehicle.

With reference to the Figures, wherein like numerals indicate like parts throughout the several views, an airbag system 10 includes an inflator 12 and an airbag 14 in communication with the inflator 12. As shown in FIGS. 4-5, the airbag system 10 includes a tether actuator 16 and tethers 18 extending from the tether actuator 16 to the airbag 14. A controller 20, as shown in FIG. 9, is programmed to receive signals from an impact sensing system 22 and a steering wheel angle sensor 24. The controller 20 is programmed to instruct the tether actuator 16 to release at least one of the tethers 18 based at least on the signals from the steering wheel angle sensor 24 and the impact sensing system 22.

Since the controller 20 is programmed to instruct the tether actuator 16 based on signals from the steering wheel angle sensor 24 and the impact sensing system 22, the controller 20 may instruct the tether actuator 16 to release a selected tether 18 based on magnitude and direction of a vehicle impact and a rotational position of a steering wheel 26. As set forth further below, the airbag 14 may rotate with the steering wheel 26. In the event of an oblique impact or a side impact of the vehicle 28, the occupant may impact the airbag 14 and may slide along the airbag 14. The controller 20 may instruct the tether actuator 16 to release a selected tether 18, based on the rotational position of the steering wheel 26 and the direction of the vehicle impact, to reduce and/or prevent the sliding of the occupant along the airbag 14 in such situations.

For example, the airbag 14 may include a main portion 30 and a plurality of extensions 32 supported on the main portion 30. The main portion 30 may define an inflation chamber 34 and the plurality of extensions 32 may be in communication with the inflation chamber 34. The tethers 18 may extend from the tether actuator 16 to the extensions 32. As set forth above, the airbag 14 may rotate with the steering wheel 26, i.e., the extensions 32 may rotate with the steering wheel 26 relative to an occupant of the vehicle 28. The controller 20 may instruct the tether actuator 16 to release a selected tether 18, and thus release a selected extension 32, to reduce and/or prevent sliding of the occupant along the airbag 14, based on a signal indicating the angle of the steering wheel 26 from the steering wheel angle sensor 24 and based on a signal indicating the direction of the impact force from the impact sensing system 22. As one example, in the event of a front left oblique impact of the vehicle 28, the controller 20 may instruct the tether actuator 16 to release an extension 32 disposed on a left side of the airbag 14, as shown in FIG. 5. Specifically, in this example, if the occupant is in the process of turning the steering wheel 26 at the time of the front left oblique impact, the controller 20 may instruct the tether actuator 16 to release the tether 18 disposed at the left side of the airbag 14 at the time of impact. Similarly, in the event of a front right oblique impact of the vehicle 28, the controller 20 may instruct the tether actuator 16 to release an extension 32 disposed on a right side of the airbag 14. In any event, the controller 20 may instruct the tether actuator 16 to release a tether 18 on the left side of the airbag 14 in response to any impact that may slide the occupant leftward along the airbag 14, and may instruct the tether actuator 16 to release a tether 18 on the right side of the airbag 14 in response to any impact that may slide the occupant rightward along the airbag 14.

Figure 1:
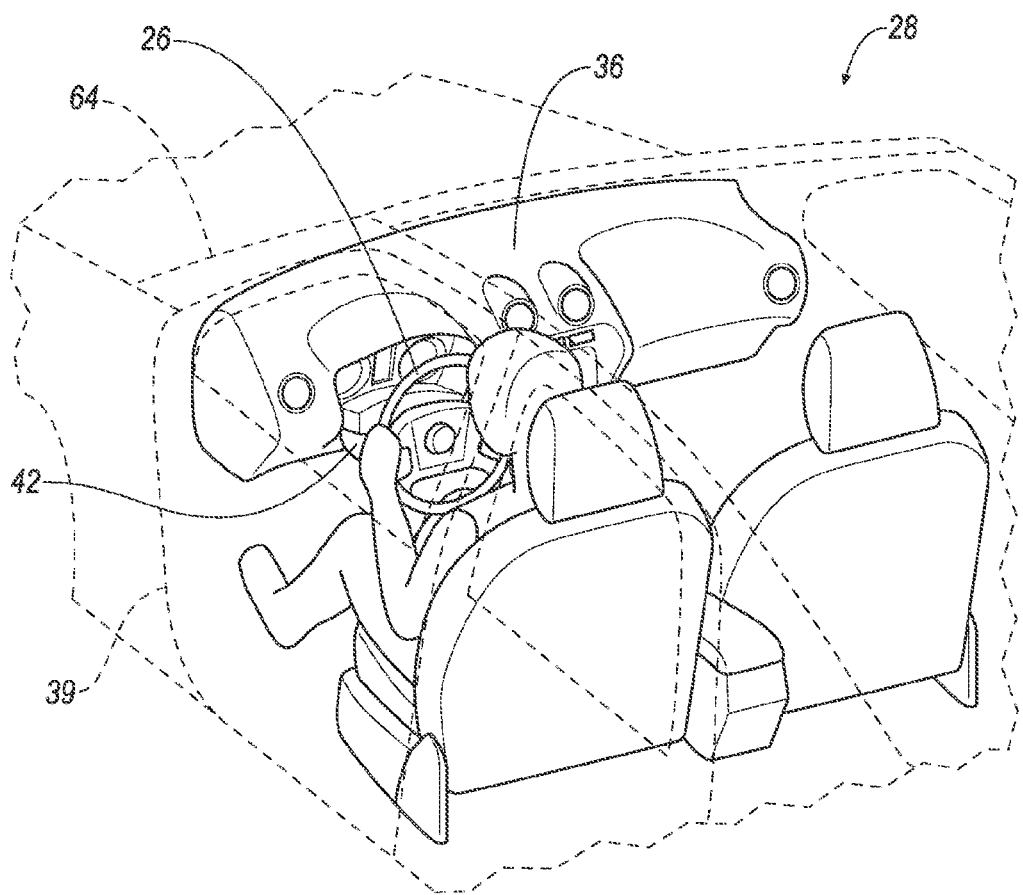
FIG. 1 is a perspective view of a vehicle including an airbag assembly supported by a steering wheel with the airbag of the airbag assembly in an uninflated position.
Figure 2:
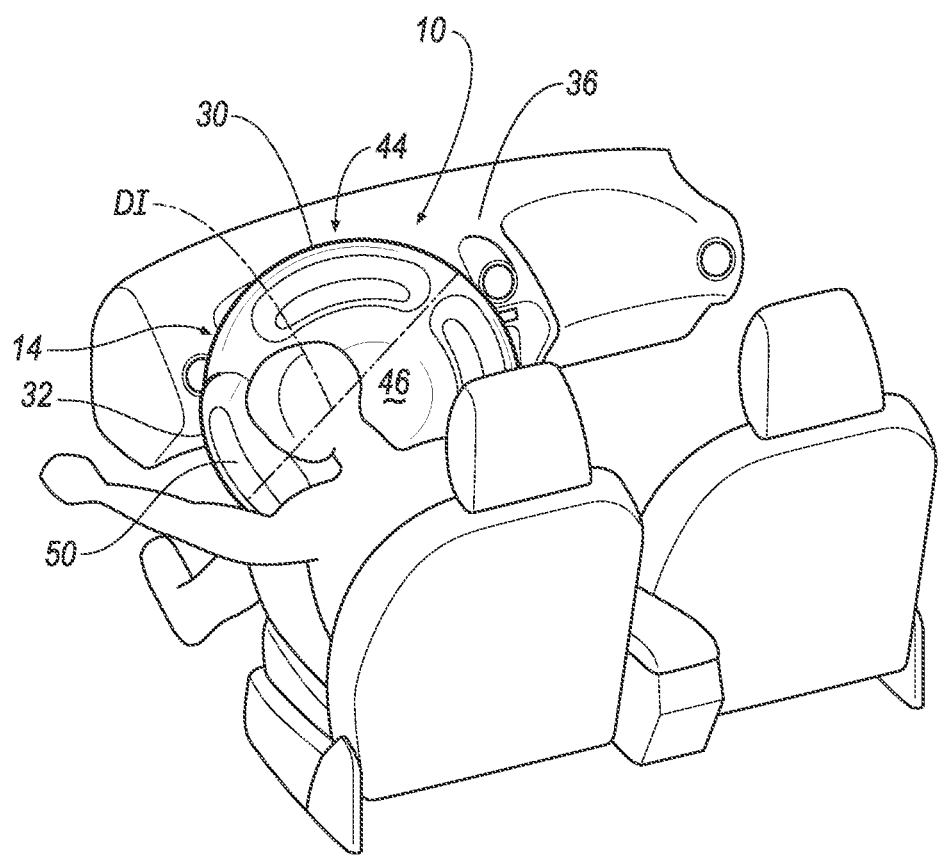
FIG. 2 is a perspective view of the vehicle including the airbag in an inflated position with one of the plurality of extensions in a deployed position.
Figure 3:
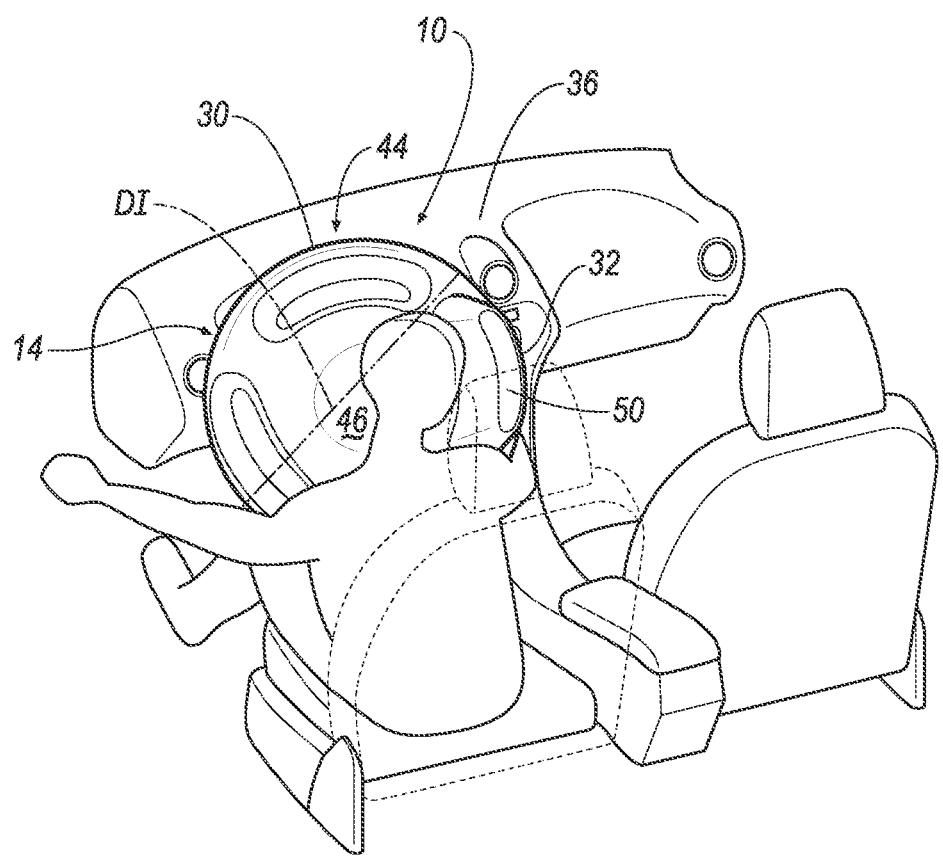
FIG. 3 is a perspective view of the vehicle including the airbag in an inflated position and another one of the plurality of extension in a deployed position.

As set forth above, the airbag system 10 may be installed in a vehicle 28, as shown in FIGS. 1-3. The vehicle 28 may be of any suitable type. The vehicle 28 may, for example, include a center console 36, a driver side door 38, and the steering wheel 26 disposed between the center console 36 and the driver side door 38. The center console 36 may be disposed in a middle of the vehicle 28 at the front of a passenger compartment of the vehicle 28, i.e., forward and to the right of the steering wheel 26. The driver side door 38 may be disposed to the left of the steering wheel 26. The steering wheel 26 is supported on a steering column 42 and is rotatable relative to the steering column 42 to steer the vehicle 28.

An airbag assembly 44, i.e., an airbag 14 module, may include a base 40 and the airbag 14. The airbag 14 may be supported by the base 40. The base 40 may be fixed relative to the steering wheel 26. For example, the base 40 and the airbag 14 may rotate with the steering wheel 26, as set forth above.

The airbag assembly 44 includes an inflator 12 (shown schematically in FIG. 9) in communication with the inflation chamber 34 to expand the inflation chamber 34 with the inflation medium, such as a gas. The inflator 12 may be, for example, a cold-gas inflator, a pyrotechnic inflator that uses a chemical reaction to drive inflation medium to the inflation chamber 34, etc. The inflator 12 may be of any suitable type for inflating the airbag 14.

The base 40 of the airbag assembly 44 may be define a cavity (not shown) that houses the airbag 14 in the uninflated position. The base 40 may support the inflator 12 and may be mounted to the steering wheel 26 and/or the steering column 42 to support the airbag assembly 44 on the steering wheel 26 and/or the steering column 42. The base 40 may be mounted to the steering wheel 26 and/or the steering column 42 in any suitable manner.

The airbag 14 is inflatable from an uninflated position, as shown in FIG. 1, to an inflated position, as shown in FIGS. 2-5. The airbag 14 presents an impact surface 46 spaced from the base 40 in the inflated position. The impact surface 46 is spaced from the steering wheel 26 in the inflated position.

The airbag 14 defines an inflation chamber 34 that is inflated with an inflation medium, as set forth further below. As set forth further below, the inflation chamber 34 may be in communication with the extension 32 when the tether 18 is released to inflate the extension 32 with the inflation medium.

With reference to FIGS. 2 and 3, the impact surface 46 may be the surface of the airbag 14 directly in front of the occupant and may be the surface that the occupant initially impacts during a vehicle impact. The impact surface 46 may extend in a cross-vehicle direction. For example, the impact surface 46 may extend in a plane generally perpendicular to the longitudinal axis of the vehicle 28. The impact surface 46 may extend to an outer perimeter OP of the airbag 14. As shown in FIGS. 4 and 5, a diameter DE of the extension 32 through the perimeter surface 48 is less than a diameter DI of the impact surface 46.

The airbag 14 may be formed of any suitable type of material, e.g., from a woven polymer. For example, the airbag 14 may be formed of woven nylon yarn, e.g., nylon 6, 6. Other suitable examples include polyether ether ketone (PEEK), polyetherketoneketone (PEKK), polyester, or any other suitable polymer. The woven polymer may include a coating, such as, for example, silicone, neoprene, urethane, etc. For example, the coating may be polyorgano siloxane.

Figure 6:
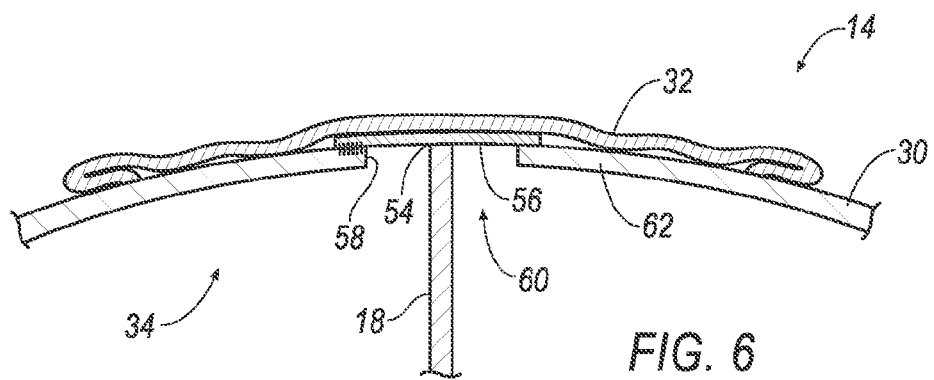
FIG. 6 is a cross-sectional view of the airbag through one of the extensions when the extension is in the undeployed position.

As set forth above, the airbag 14 may include a plurality of extensions 32. Each of the extensions 32 may be independently inflated from an undeployed position, as shown in FIGS. 4 and 6, to a deployed position. One of the extensions 32, for example, is shown in the deployed position in FIGS. 2, 3, 5, 7, and 8. The extensions 32 may be independently inflated, i.e., one or more of the extensions 32 may be inflated independently of the other extensions 32, to limit or prevent sliding of the head of the occupant across the impact surface 46 of the airbag 14 while limiting delay of inflation of the main portion 30. In other words, extensions 32 not needed to prevent sliding of the head of the occupant may be retained in the undeployed position, as shown in FIG. 6, to avoid reducing the inflation time of the main portion 30. More than one extension 32 may be inflated to the deployed position depending on the direction and magnitude of the vehicle impact.

Each extension 32 may include a perimeter surface 48 and the perimeter surface 48 may extend transversely from the impact surface 46 around a perimeter P of the extension 32 in the deployed position. In other words, the perimeter surface 48 may extend along a path that crosses a line along which the impact surface 46 extends near the extension 32. The perimeter surface 48 may extend at a right angle, i.e., 90 degrees, relative to the impact surface 46.

A transition from the perimeter surface 48 to the impact surface 46 may be angular or may be rounded. The extensions 32 may be formed separately from the main portion 30 and subsequently connected the main portion 30 about the perimeter surface 48, e.g., stitched, or may be integrally formed with main portion 30 about the perimeter surface 48, i.e., formed simultaneously with the main portion 30 as a single continuous unit.

The perimeter surface 48 of the extension 32 extends around the perimeter of the extension 32. Specifically, the perimeter surface 48 is continuous, and the perimeter surface 48 extends entirely around and encloses the portion of the inflation chamber 34 that extends into the extension 32.

The extension 32 includes an end 50 spaced from the impact surface 46. The tether 18 may be connected to the end 50. The end 50 may be flat, as shown in FIGS. 2-8, or may be rounded. The extension 32 shown in FIGS. 2-8 has a kidney shaped cross-section, however, the extension 32 may have any suitable shape.

When the airbag 14 is in the inflated position and the extension 32 is in the undeployed position, the extension 32 may be folded on the impact surface 46, as shown in FIG. 6. Alternatively, when the airbag 14 is in the inflated position and the extension 32 is in the undeployed position, the extension 32 may be flush with the impact surface 46 around the perimeter of the extension 32 or may be slightly indented relative to the impact surface 46 around the perimeter of the extension 32.

When the airbag 14 is in the inflated position and the extension 32 is in the deployed position, the extension 32 extends farther outwardly relative to the impact surface 46. As set forth above, the perimeter surface 48 of the extension 32 extends transversely from the impact surface 46 around the perimeter P of the extension 32 when the extension 32 is in the deployed position.

The plurality of extensions 32 may be disposed about the outer perimeter OP of the impact surface 46 to reduce and/or prevent sliding of the head of the occupant from sliding along the airbag 14 in side or oblique impacts. The airbag 14 may be configure to position at least one of the extensions 32 between the steering wheel 26 and the driver side door 38 and to position at least one of the extensions 32 between the steering wheel 26 and the center console 36 in any rotational position of the steering wheel 26. For example, the extensions 32 may be sized and positioned such that, in any rotational position of the steering wheel 26, at least one extension 32 is disposed between the steering wheel 26 and the driver door 38 and at least one extension 32 is disposed between the steering wheel 26 and the center console 36. The airbag 14 may include any suitable number of extensions 32. The extensions 32 shown in FIGS. 4-5 extend along a single concentric path, e.g., circumferentially about the main portion 30 of the airbag 14. The airbag 14 may include additional extensions 32 along additional concentric paths.

The extensions 32 may be of identical construction, size, and shape. Alternatively, the extensions 32 may have differing construction, size, and/or shape. Common numerals are used herein to refer to common features of the extensions 32 in the Figures.

The airbag 14 may include one or more tethers 18 for each extension 32. Each tether 18 may be formed of the same construction and material, or, alternatively, the tethers 18 may be formed of a different construction and/or material relative to each other. The tethers 18 may be formed of the same type of material as the airbag 14 or from any other suitable type of material.

Figure 7:
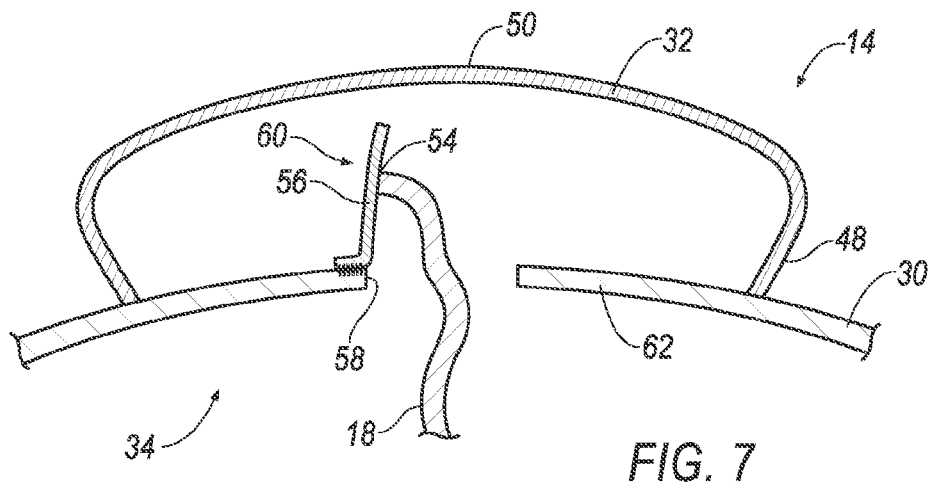
FIG. 7 is a cross-sectional view of the airbag through one of the extensions when the extension is in the deployed position with a flap open to allow gas flow from an inflation chamber into the extension.

Each tether 18 extends between a first end 52 and a second end 54. The first end 52 of the tether 18 is anchored when the airbag 14 is in the uninflated position. For example, the first end 52 may be fixed relative to the base 40 of the airbag 14, as shown in FIGS. 5 and 7. Specifically, the first end 52 may be fixed to the tether actuator 16. The first end 52 of the tether 18 may be anchored in any suitable manner, e.g., fusing, adhesive, integral formation (i.e., simultaneous formation of the airbag 14 and the tether 18 fixed to the extension 32), etc. The second end 54 of the tether 18 may be fixed to a one-way valve 60, e.g., a flap 56, as described further below.

Figure 8:
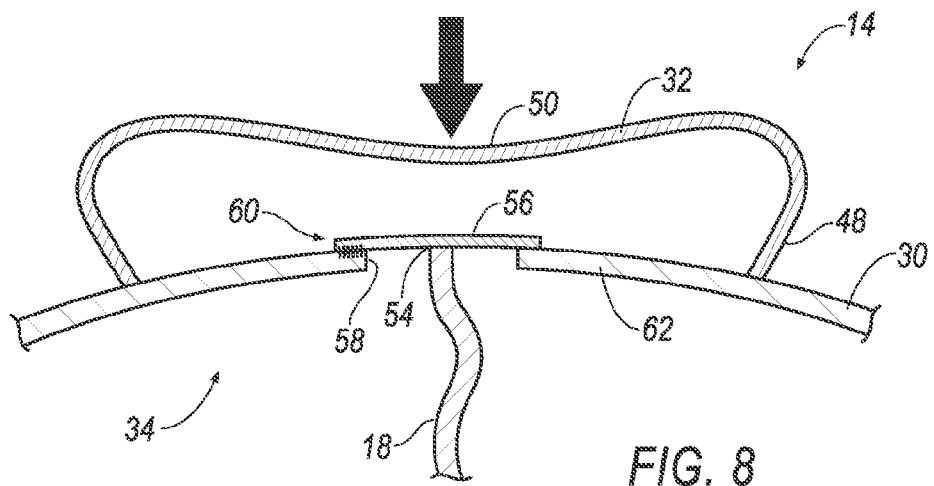
FIG. 8 is a cross-sectional view of the airbag through one of the extensions when the extension is in the deployed position and a force is applied to the extension with the flap closed to restrict gas flow from the extension to the inflation chamber.

The tether 18 is configured to selectively retain the extension 32 in the undeployed position, i.e., a retracted position, relative to the impact surface 46, as shown in FIG. 6, and to selectively release the extension 32 to the deployed position, i.e., an extended position, relative to the impact surface 46, as shown in FIGS. 7 and 8. Specifically, as set forth further below for example, the vehicle 28 includes an impact sensing system 22 that may sense an impact of the vehicle 28 and may trigger inflation of the airbag 14 in response to a sensed impact. In addition, the impact sensing system 22 may sense the type of impact, e.g., based on direction, magnitude, etc.

The airbag 14 may define holes 58 between the main portion 30 and each extension 32. The holes 58 extend between the inflation chamber 34 and the extensions 32 to allow gas flow from the inflation chamber 34 to the extensions 32 when the main portion 30 of the airbag 14 is inflated and the extensions 32 are deployed. Specifically, when the main portion 30 of the airbag 14 is inflated and one of the tethers 18 is released, the inflation medium flows from the inflation chamber 34 in the main portion 30, through the respective hole 58, and into the respective extension 32, as shown in FIG. 7. For the tethers 18 that are not released, the respective tether 18 retains the respective extension 32 in the undeployed position and limits or prevents gas flow from the inflation chamber 34 through the respective hole 58 into the respective extension 32, as shown in FIG. 6.

The airbag 14 may include means for restricting gas flow from the extension 32 to the inflation chamber 34 in the inflated position when the extension 32 is in the deployed position and is impacted. In other words, this means retains the extension 32 inflated in the deployed position when an occupant impacts the extension 32, i.e., to limit or prevent deflation of the extension 32 to limit or prevent sliding of the occupant's head past the extension 32.

For example, the airbag 14 may include one-way valves 60 to prevent gas flow from the extension 32 to the main portion 30 when the extension 32 in the deployed position is impacted. For example, the one-way valve 60 may be a flap 56 at each hole 58. The flaps 56 may be configured to uncover the respective hole 58 to allow gas flow from the inflation chamber 34 to the respective extension 32 when the respective tether 18 is released, as shown in FIG. 7, and to cover the respective hole 58 when the respective extension 32 is impacted to limit or prevent gas flow from the extension 32 back into the main portion 30 as shown in FIG. 8. The means for restricting gas flow from the extension 32 to the inflation chamber in the inflated position when the extension 32 is in the deployed position and impacted may be the one-way valve 60, e.g., the flap 56/hole 58, and structural equivalents thereof.

The flaps 56 may be mounted to the main portion 30 adjacent the holes 58. The main portion 30 of the airbag 14 may, for example, define a platform 62 inside the extension 32 and the flaps 56 may be connected to the platform 62. For example the flaps 56 may be sewn to the main portion 30, i.e., to the platform 62. Alternatively, the flaps 56 may be connected to the main portion 30 in any suitable manner, e.g., fusion, adhesion, bonding, welding, fastening, etc.

The flaps 56 may be formed of the same type of material as the main portion 30 of the airbag 14 or may be formed of a separate material. The flaps 56 may be integrally formed with the main portion 30 of the airbag 14, i.e., formed simultaneously with the main portion 30, or may be formed separately from and subsequently connected to the main portion 30.

The tethers 18 may be connected to the flaps 56 in any suitable fashion. The tethers 18 may be formed separately from and subsequently connected to the flaps 56. For example, the tethers 18 may be sewn to the flaps 56. Alternatively, the tethers 18 may be connected to the main portion 30 in any suitable manner, e.g., fusion, adhesion, bonding, welding, fastening, etc. Alternatively, the tethers 18 may be integrally formed with the flaps 56, i.e., formed simultaneously with the flaps 56.

The tether actuator 16 is connected to the tether 18 and is configured to selectively release at least one of the tethers 18. The tether actuator 16 may programmed to receive an instruction from a controller 20, e.g., a restraints control module of the vehicle 28, to release the tether 18. The controller 20 may provide an instruction to the tether actuator 16 based signals from the impact sensing system 22 and the steering wheel angle sensor 24. The controller 20, e.g., the restraints control module, may also control the inflator 12, i.e., to provide instructions to the inflator 12 to inflate the airbag 14.

The tether actuator 16 may be of any suitable type to selectively retain the tether 18 to retain the extension 32 in the undeployed position, as shown in FIG. 6, and to selectively release the tether 18 to release the extension 32 to the deployed position, as shown in FIGS. 76 and 8. As one example, the tether 18 may include a plurality of pins (not shown) each connected to the first end 52 of the tether 18, and a plurality of actuators (not shown) connected to the pins and in communication with the controller 20. The actuators, for example, may be actuated mechanically, pneumatically, hydraulically, etc. At rest, the actuators may retain the pins pinned to the first end 52 of the extensions 32. Based on signals from the impact sensing system 22 and/or the steering wheel angle sensor 24, the controller 20 may provide instruction to at least one of the actuators to release the pin, and thus release the associated tether 18 and extension 32 to the deployed position.

In the alternative to pins, the tether actuator 16 may be releasably connected to the first end 52 of the tether 18 in any suitable manner. As another example, the tether actuator 16 may include one or more cutters (not shown) engaged with the first end 52 of the tethers 18 and in communication with the controller 20. Based on signals from the impact sensing system 22 and/or the steering wheel angle sensor 24, the controller 20 may provide instruction to the cutter to cut at least one of the tethers 18, and thus release the associated tether 18 and extension 32 to the deployed position.

Based on the type of sensed impact, the impact sensing system 22 may trigger release of one or more of the tethers 18 to allow one or more of the extensions 32 to move to the deployed position. For example, if the impact sensing system 22 detects a head-on impact, the tethers 18 may retain the extensions 32 in the undeployed position, as shown in FIG. 6. Alternatively, for example, if the impact sensing system 22 detects an oblique impact, the impact sensing system 22 may trigger release one or more of the tethers 18 to release one or more of the extensions 32 to the deployed position.

With reference to FIG. 2, during a left-side oblique impact, such as that tested during a small overlap rigid barrier (SORB) test, or a left-side angular impact, the occupant may move forward and initially impact the impact surface 46 of the airbag 14. In addition to forward movement, the occupant also moves toward the left side of the vehicle 28, as shown in FIG. 2, i.e., in the general direction toward the driver side door 38 and/or an A-pillar 64. During this forward and left motion, the head of the occupant may slide along the impact surface 46 toward the driver side door 38 and/or the A-pillar 64 and may contact the extension 32, as shown in FIG. 2, to slow and/or stop movement of the head of the occupant toward the driver side door 38 and/or A-pillar 64. In other words, because the perimeter surface 48 of the extension 32 extends transversely from the impact surface 46, the extension 32 catches the head of the occupant as the occupant slides along the impact surface 46 to slow and/or stop movement of the head of the occupant toward the driver side door 38 and/or A-pillar 64.

With reference to FIG. 3, during a right-side oblique impact test, such as that simulated by a small overlap rigid barrier (SORB) test, or a right-side angular impact, the occupant may move forward and initially impact the impact surface 46 of the airbag 14. In addition to forward movement, the occupant also moves toward the right side of the vehicle 28, as shown in FIG. 3, i.e., in the general direction toward the center console 36. During this forward and right motion, the head of the occupant may slide along the impact surface 46 toward the center console 36 and may contact the extension 32, as shown in FIG. 3, to slow and/or stop movement of the head of the occupant toward the center console 36. In other words, because the perimeter surface 48 of the extension 32 extends transversely from the impact surface 46, the extension 32 catches the head of the occupant as the occupant slides along the impact surface 46 to slow and/or stop movement of the head of the occupant toward the center console 36.

During inflation of the airbag 14 from the uninflated position to the inflated position, the airbag 14 extends in a first direction D from the base 40 to the impact surface 46, as identified in FIG. 2. Specifically, the first direction D extends generally in a vehicle 28-rearward direction from the base 40 to the impact surface 46, e.g., in parallel with the longitudinal axis of the vehicle 28. During inflation of the extension 32 from the undeployed position to the deployed position, the extension 32 extends from the impact surface 46 in the first direction. In other words, the extension 32 extends from the impact surface 46 in the same direction as the airbag 14 extends from the base 40.

A schematic of a control system 66 of the vehicle 28 is shown in FIG. 9. The control system 66 may include an impact sensing system 22, a restraints control system 68, and a chassis control system 70.

The control system 66 may include a communication bus 72, such as a controller area network (CAN) bus, of the vehicle 28. The impact sensing system 22, the restraints control system 68, and the chassis control system 70 may be in communication with the communication bus 72. The controller 20, e.g., the restraints control module, may be configured use information from the communication bus 72 to control the activation of the inflator 12 and/or the tether actuator 16. The inflator 12 and/or the tether actuator 16 may be connected to the controller 20, as shown in FIG. 9, or may be connected directly to the communication bus 72.

The impact sensing system 22 may include at least one sensor 74 for sensing impact of the vehicle 28. The sensor 74 may be in communication with the controller 20 of the restraints control system 68, e.g., the restraints control module. The impact sensing system 22 may be configured to determine the direction and/or magnitude of the vehicle impact. Specifically, the impact sensing system 22 may include a plurality of impact sensors 74 disposed at various positions of the vehicle 28 for sensing various directions, magnitudes, etc., of impacts.

Based on signals from the sensor 74, the controller 20, e.g., the restraints control module, may instruct the inflator 12 to inflate the airbag 14, e.g., for providing an impulse to a pyrotechnic charge of the inflator 12, when the sensor senses an impact of the vehicle 28. Alternatively or additionally to sensing impact, the impact sensing system 22 may be configured to sense impact prior to impact, i.e., pre-impact sensing. The sensor 74 may be of any suitable type, e.g., using radar, lidar, and/or a vision system. The vision system may include one or more cameras, CCD image sensors, and/or CMOS image sensor, etc.

The controller 20, e.g., the restraints control module, may be a microprocessor-based controller 20. The sensor is in communication with the controller 20 to communicate a signal to the controller 20. Based on the signal communicated by the sensor 74, the controller 20 instructs the inflator 12 to activate.

The controller 20 may, for example, be a computing device including a processor, memory, etc. The memory may store instructions comprising programming to perform the functions described herein.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The chassis control system 70 includes the steering wheel angle sensor 24. The steering wheel angle sensor 24 senses the rotational position of the steering wheel 26, e.g., relative to a base 40 position. The chassis control system 70 includes a chassis control module 76 in communication with the communication bus 72. The chassis control module 76 may be configured to receive a signal from the steering wheel angle sensor 24 indicating the rotational position of the steering wheel 26. The chassis control module 76 may communicate a signal to the communication bus 72 indicating the rotational position of the steering wheel 26. The controller 20, e.g., the restraints control module, of the restraints control system 68 may be configured to receive the signal indicating the rotational position of the steering wheel 26.

As set forth above, the restraints control system 68 includes the controller 20, e.g., the restraints control module, the inflator 12 in communication with the controller 20, and the tether actuator 16 in communication with the controller 20. Based on signals from the impact sensing system 22, e.g., the impact sensors 74, and the chassis control system 70, e.g., the steering wheel angle sensor 24, the controller 20, e.g., the restraints control module, may provide instruction to the inflator 12 to inflate the main portion 30 of the airbag 14 and may provide instruction to the tether actuator 16 to release one or more of the tethers 18 to release one or more of the extensions 32. The instruction from the controller 20 to the tether actuator 16 may be based on the direction of the vehicle impact, as sensed by the impact sensing system 22, and/or may be based on the rotational position of the steering wheel 26, as sensed by the steering wheel angle sensor 24.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag system comprising:
an inflator;
an airbag in communication with the inflator;
a tether actuator and tethers extending from the tether actuator to the airbag;
a controller programmed to receive signals from an impact sensing system and a steering wheel angle sensor, and to instruct the tether actuator to release at least one of the tethers based at least on the signals from the steering wheel angle sensor and the impact sensing system.

2. The system as set forth in claim 1 wherein the airbag includes a main portion defining an inflation chamber, and a plurality of extensions in communication with the inflation chamber, and wherein the tethers extend from the tether actuator to the extensions.

3. The system as set forth in claim 2 wherein the airbag presents an impact surface spaced from the inflator in an inflated position and wherein the plurality of extensions are disposed about a perimeter of the impact surface.

4. The system as set forth in claim 2 wherein the airbag defines holes between the main portion and the extension and includes flaps connected to the tethers and mounted to the main portion adjacent the holes.

5. A method comprising:
receiving a signal from an impact sensing system indicating at least an occurrence of an impact of a vehicle;
receiving a signal from a steering wheel angle sensor indicating at least a rotational position of a steering wheel of the vehicle;
instructing a tether actuator to release at least one of a plurality of tethers based at least on the signals from the steering wheel angle sensor and the impact sensing system.

6. The method as set forth in claim 5, wherein the signal from the impact sensing system indicates at least a direction of the impact.

* * * * *